US006850289B2

(12) United States Patent
Lee

(10) Patent No.: US 6,850,289 B2
(45) Date of Patent: Feb. 1, 2005

(54) ARRAY SUBSTRATE FOR LIQUID CRYSTAL DISPLAY DEVICE

(75) Inventor: Ju-Young Lee, Gyeongsangbuk-do (KR)

(73) Assignee: LG. Philips LCD Co. Ltd., Seoul (KR)

( * ) Notice: Subject to any disclaimer, the term of this patent is extended or adjusted under 35 U.S.C. 154(b) by 46 days.

(21) Appl. No.: 10/456,551

(22) Filed: Jun. 9, 2003

(65) Prior Publication Data

US 2004/0041153 A1 Mar. 4, 2004

(30) Foreign Application Priority Data

Sep. 4, 2002 (KR) ................................ 10-2002-0053208

(51) Int. Cl.[7] ................................................ G02F 1/136

(52) U.S. Cl. ........................... 349/42; 257/59; 257/202; 257/206; 257/208; 349/47; 349/59

(58) Field of Search ................................ 257/202, 206, 257/208, 59; 349/42, 47, 59

(56) References Cited

U.S. PATENT DOCUMENTS 4,917,467 A * 4/1990 Chen et al. .................... 349/54
5,132,677 A * 7/1992 Nicholas ...................... 345/92
5,668,613 A * 9/1997 Kim et al. .................... 349/38
6,377,322 B2 * 4/2002 Yamaguchi et al. .......... 349/42

* cited by examiner

*Primary Examiner*—Allan R. Wilson
*Assistant Examiner*—Edgardo Ortiz
(74) *Attorney, Agent, or Firm*—Birch, Stewart, Kolasch & Birch, LLP

(57) ABSTRACT

The present invention is related to an array substrate for use in a liquid crystal display. The array substrate includes a transparent substrate; a plurality of gate lines arranged over the transparent substrate in a transverse direction; a plurality of data lines arranged over the transparent substrate in a longitudinal direction substantially perpendicular to the plurality of gate lines, intersections of the plurality of data lines and the plurality of gate lines defining a plurality of pixel regions; a gate driver contacting ends of the plurality of gate lines and sequentially scanning a gate pulse to the plurality of gate lines; a data driver contacting ends of the plurality of data lines and applying a data pulse to the plurality of data lines; a plurality of pixel electrodes disposed in the plurality of pixel regions; a plurality of first thin-film transistors disposed in the plurality of pixel regions, each first thin-film transistor including a gate electrode connected to a gate line, a source electrode connected to a data line, and a drain electrode connected to the pixel region; a feed line outputting an OFF voltage to the plurality of first thin-film transistors; and a plurality of second thin-film transistors contacting each other and connecting the feed line to the plurality of gate lines.

27 Claims, 6 Drawing Sheets

ARRAY SUBSTRATE FOR LIQUID CRYSTAL DISPLAY DEVICE

CROSS-REFERENCE TO RELATED APPLICATION

This application claims priority under 35 U.S.C. § 119 to Korean Patent Application No. 2002-0053208, filed Sep. 4, 2002, in Korea, the entire disclosure of which is hereby incorporated by reference.

BACKGROUND OF THE INVENTION

1. Field of the Invention

The present invention relates in general to a liquid crystal display device and, more particularly, to an array substrate having a plurality of thin-film transistors that compensates for a falling time delay caused by an RC delay of a gate pulse.

2. Discussion of the Related Art

Until recently, a cathode-ray tube (CRT) has generally been used for display systems. However, use of flat panel displays is increasingly common, because of their small depth, desirably low weight, and relatively minimal power consumption. Presently, thin-film transistor-liquid crystal displays (TFT-LCDs) are being developed with high resolution and small depth.

Liquid crystal display (LCD) devices generally make use of optical anisotropy and polarization properties of liquid crystal molecules to control alignment orientation. The alignment direction of the liquid crystal molecules can be controlled by application of an electrical field. Accordingly, when an electrical field is applied to liquid crystal molecules, the alignment of the liquid crystal molecules changes. Since refraction of incident light is determined by the alignment of the liquid crystal molecules, the display of image data can be controlled by changing the applied electrical field.

Of the different types of known LCDs, active matrix LCDs (AM-LCDs), which have thin-film transistors and pixel electrodes arranged in a matrix form, are of particular interest because of their high resolution and superior display of moving images. Because of their light weight, thin profile, and low power consumption, LCD devices have wide application in office automation (OA) equipment and video units. A typical LCD panel may include an upper substrate, a lower substrate and a liquid crystal layer interposed therebetween. The upper substrate, commonly referred to as a "color filter substrate," may include a common electrode and color filters. The lower substrate, commonly referred to as an "array substrate," may include switching elements, such as thin-film transistors (TFTs), and pixel electrodes.

FIG. 1 is a cross-sectional view of a pixel of a related art LCD panel in an active matrix LCD. FIG. 2 is a schematic diagram showing the main components of a related art active matrix LCD.

As shown in FIGS. 1 and 2, an LCD panel 10 includes upper and lower substrates 20 and 30, respectively, and a liquid crystal (LC) layer 50 interposed therebetween. The lower substrate 30 is transparent and includes a thin-film transistor (TFT) T as a switching element that transmits a voltage to a pixel electrode 32 disposed over the lower substrate 30 to change the orientation of the LC molecules. The pixel electrode 32 applies an electrical field across the LC layer 50 in response to signals applied to the TFT T. The lower substrate 30 is commonly made of glass. Moreover, the lower substrate 30 includes a storage capacitor $C_{ST}$ that maintains the voltage on the pixel electrode 32 for a period of time. A plurality of gate lines 36 are disposed over the lower substrate 30 in a transverse direction, as shown in FIG. 2, and a plurality of data lines 40 are also disposed over the lower substrate 30 in a longitudinal direction substantially perpendicular to the gate lines 36.

The upper substrate 20 includes a color filter 22 for producing a specific color and a black matrix 26 for preventing light leakage of the LC layer 50. A common electrode 24 is disposed to cover the color filter 22 and the black matrix 26. The common electrode 24 serves as an electrode for producing the electrical field across the LC layer 50 (in combination with the pixel electrode 32). The common electrode 24 may be arranged over a pixel region P, which corresponds to a display area. The color filter 22 may be a red, green or blue color filter. The black matrix 26 is disposed among the red, green and blue color filters and protects the TFT T from external incident light. To prevent leakage of the LC layer 50, the substrates 20 and 30 may be sealed by a sealant.

As shown in FIG. 2, the pixel regions P are defined at the intersections of the gate lines 36 and the data lines 40 in a matrix. Each TFT T and the pixel electrode 32 are disposed in a corresponding pixel region P. Further, the common electrode 24, the pixel electrode 32 and the interposed LC layer 50 define a liquid crystal (LC) capacitor $C_{LC}$. The storage capacitor $C_{ST}$ is connected in parallel to the LC capacitor $C_{LC}$ within the pixel region P. The storage capacitor $C_{ST}$ is necessary to compensate for the problem of parasitic capacitance. Further, as shown in FIG. 1, first and second polarizers 28 and 34 are formed on outer surfaces of the upper and lower substrates 20 and 30, respectively.

Referring again to FIG. 1, an image is displayed by the combination of red, green and blue color filters by light passing through the first and second polarizers 28 and 34 and the LC layer 50. A backlight device 60 is disposed under the lower substrate 30 and emits artificial light toward the LCD panel 10. Since the LCD panel 10 does not illuminate by itself, the backlight device 60 is required to provide sufficient brightness. The upper and lower substrates 20 and 30 can include alignment layers (not shown) in their inner surfaces adjacent to the LC layer 50 in order to define the initial arrangement of the liquid crystal molecules.

As shown in FIG. 2, a gate driver 38 is connected to the gate lines 36 and is formed in a periphery of the lower substrate 30. The gate driver 38 sequentially applies a gate pulse to the gate lines 36. A data driver 42, which is connected to the data lines 40, is disposed in a top periphery of the lower substrate 30. The data driver 42 applies a data pulse to the data lines 40. The gate pulse applied to the gate lines 36 turns on the TFTs T, and the data pulse applied to the data lines 40 is an LC driving voltage that changes the arrangement of the liquid crystal molecules.

FIG. 3 is a partial enlarged view of a circuit diagram illustrating the related art active matrix LCD of FIG. 2.

In FIG. 3, the TFT T, which is formed in the pixel region P, includes a gate electrode "g" that is connected to the gate line 36, a source electrode "s" that is connected to the data line 40, and a drain electrode "d" that is connected to the LC capacitor $C_{LC}$. The TFT T is turned on or off by the applied gate pulse, thereby acting as a switch applying the data pulse to the LC capacitor $C_{LC}$.

The LCD panel 10 of FIG. 1 displays images frame-by-frame. As shown in FIG. 2, the gate driver 38 applies the gate pulse to sequentially scan the G1 to Gm gate lines. The data driver 42 applies the data pulse, which corresponds to the gate pulse, to all data lines D1 to Dm, respectively. For example, when the gate pulse is applied to the Gm-1 gate line, the data pulse is applied to the D1 to Dm data lines. Thus, the TFTs T1 to Tm connected to the Gm-1 gate line are turned on. Then the data pulse applied to the D1 to Dm data lines is delivered to the designated LC capacitor $C_{LC}$ of the pixel P. The LC capacitor $C_{LC}$ holds an intended voltage applied through the data lines, and the intended voltage changes the arrangement of the liquid crystal molecules.

Meanwhile, when the gate pulse is applied to the gate line 36, the gate pulse travels from left to right, as shown in FIG. 2, through the gate line 36. However, since the gate line 36 is conductive and has its own electrical resistance and capacitance, a pulse waveform becomes different from the first addressed waveform as it travels to the right.

FIGS. 4A and 4B are graphs illustrating a gate pulse and a data pulse which are applied to the different TFTs T1 and Tm connected to the Gm-1 gate line of FIG. 3. FIG. 4A corresponds to the first TFT T1 to which the gate pulse G(N) is first applied, and FIG. 4B corresponds to the last TFT Tm to which the gate pulse G(N) is applied through the Gm-1 gate line. The Gm-1 gate line is selected for simplification of description. The description hereinafter can be adapted to the other gate lines G1 to Gm. Further, as shown in FIG. 3, the TFTs connected to the Gm-1 gate line are denoted as T1 to Tm from left to right.

In FIGS. 4A and 4B, D(N) denotes the data pulse applied to the TFT T1 and the TFT Tm. D(N−1) denotes the data pulse applied to the TFTs connected to the Gm-2 gate line prior to the Gm-1 gate line. D(N+1) denotes the data pulse applied to the TFTs connected to the Gm gate line next to the Gm-1 gate line.

The gate pulse G(N) and the data pulse D(N) have a square waveform and thus have a rising slope to initially maintain a predetermined voltage in the middle, and have a falling slope in a last step. Each time the gate pulse G(N) applied to the Gm-1 gate line rises, the TFTs T1 to Tm are turned ON if the voltage is boosted over a threshold voltage Vth. Thereafter, the date pulse D(N) is applied to the LC capacitor $C_{LC}$; then the electrical charges are stored in the LC capacitor $C_{LC}$. When the gate pulse G(N) falls below the threshold voltage Vth, the thin-film transistors T1 to Tm are turned OFF, and the data pulse D(N) is shut down from the KC capacitor $C_{LC}$.

In FIGS. 4A and 4B, a section Ta denotes a charging time in which the data pulse voltage is held by the LC capacitor $C_{LC}$, and a section Tb denotes an OFF time during which the TFTs T1 to Tm are turned off when the gate pulse G(N) falls to the threshold voltage Vth. During the section Tb, although the gate pulse G(N) continues to fall, the data pulse D(N) maintains a designated voltage. When the gate pulse G(N) reaches the threshold voltage Vth, the data pulse D(N) starts falling. The falling of data pulse D(N) with the arrival of the gate pulse to the threshold voltage Vth maintains the reliability of the TFTs during their OFF-state operation and prevent noise caused by the next data pulse D(N+1). In other words, the TFTs T1 to Tm remain in the ON state from the time the falling of gate pulse G(N) starts until the gate pulse G(N) reaches the threshold voltage Vth. Depending on the particular characteristics of the TFTs, the TFTs T1 to Tm can be turned ON slightly, although the gate pulse G(N) is under the threshold voltage Vth.

If the falling of the gate pulse and the falling of data pulse occur at the same time, the data pulse D(N+1) corresponding to the next gate line Gm can be applied to the TFTs T1 to Tm before the TFTs T1 to Tm connected to the Gm-1 gate line are turned OFF. Further, the data pulse D(N) can intermix with the data pulse D(N+1), and the LC capacitor $C_{LC}$ can have the noise of mixing two data pulses D(N) and D(N+1). To prevent this phenomenon, the data pulse D(N) maintains the designated voltage during the section Tb after the gate pulse G(N) starts falling. The data pulse D(N) begins to fall after the gate pulse G(N) drops below the threshold voltage Vth; then the TFTs T1 to Tm are all turned OFF.

Comparing FIG. 4A with FIG. 4B, the waveform of the gate pulse G(N) is different between the TFT T1 of FIG. 4 and the TFT Tm of FIG. 4, although the TFT T1 and the TFT Tm are both connected to the same gate line Gm-1. This phenomenon is due to the resistance and capacitance of the conductive gate line 36. The gate pulse G(N) initially applied to the first TFT T1 arrives at the last TFT Tm through the Gm-1 gate line. In other words, since the Gm-1 gate line is conductive and has its own resistance and capacitance, the gate pulse G(N) applied to the Gm-1 gate line is distorted, and the RC delay prolonging the rising and falling times of the gate pulse G(N) occurs between the first TFT T1 and the last TFT Tm. Such an RC delay becomes larger as the resistance of the gate line becomes larger or the length of the gate line becomes longer. In particular, when the falling time of the gate pulse G(N) is prolonged, the image quality of the LCD worsens.

Regarding the Gm-1 gate line, the data pulse D(N) maintains the potential at the time the gate pulse G(N) fails to solve the noise problem of mixing the data pulse D(N+1) applied to the next Gm gate line, and as noted, the data pulse D(N) starts falling after the gate pulse G(N) falls to the threshold voltage Vth of the TFT.

However, as the falling time of the gate pulse becomes longer due to the RC delay, the OFF time Tb reaching the threshold voltage Vth also becomes longer. Therefore, the charging time Ta becomes shorter in order to prevent mixture noise caused by the data line D(N+1) applied to the next Gm gate line. When the charging time Ta is shortened, it also shortens the time to charge the data pulse D(N) in the LC capacitor $C_{LC}$. As a result, the LC molecules are hardly arranged properly. Moreover, the transmissivity of the LCD deteriorates. The LCD may have reduced brightness, contrast ratio, and resolution. Additionally, the picture displayed may be blurred, or there may be an afterimage and flickering. These phenomena adversely affect the quality of the LCD.

In the related art method to solve the aforementioned problems, the gate line 36 is commonly made of a metallic material having a lower resistance, additional electric circuitry are used to enhance gate modulation, or the gate drivers may be installed at both ends of the gate lines 36. However, these conventional methods increase LCD costs and do not completely solve the various problems caused by RC delay.

SUMMARY OF THE INVENTION

Accordingly, the present invention is directed to an array substrate for use in a liquid crystal display device which substantially obviates one or more of the problems caused by the limitations and disadvantages of the related art.

One object of the present invention is to provide an array substrate for a falling time delay caused in a gate pulse due to RC delay.

Another object of the present invention is to provide an array substrate for enhancing reliability of an LCD.

Additional features and advantages of the invention will be set forth in the description which follows and, in part, will be apparent from the description or may be learned by practice of the invention. The objectives and other advantages of the invention will be realized and attained by the structure particularly pointed out in the written description and claims herein, as well as the appended drawings.

To achieve these and other advantages and in accordance with the purpose of the present invention, as embodied and broadly described, an array substrate for use in an LCD includes a transparent substrate; a plurality of gate lines arranged over the transparent substrate in a transverse direction; a plurality of data lines arranged over the transparent substrate in a longitudinal direction substantially perpendicular to the plurality of gate lines, intersections of the plurality of data lines and the plurality of gate lines defining a plurality of pixel regions; a gate driver contacting ends of the plurality of gate lines and sequentially scanning a gate pulse to the plurality of gate lines; a data driver contacting ends of the plurality of data lines and applying a data pulse to the plurality of data lines; a plurality of pixel electrodes disposed in the plurality of pixel regions; a plurality of first thin-film transistors disposed in the plurality of pixel regions, each first thin-film transistor including a gate electrode connected to a gate line, a source electrode connected to a data line, and a drain electrode connected to the pixel region; a feed line outputting an OFF voltage to the plurality of first thin-film transistors; and a plurality of second thin-film transistors contacting each other and connecting the feed line to the plurality of gate lines.

In another aspect of the present invention, an array substrate for use in a liquid crystal display includes a transparent substrate; a plurality of gate lines arranged over the transparent substrate in a transverse direction; a plurality of data lines arranged over the transparent substrate in a longitudinal direction substantially perpendicular to the plurality of gate lines, intersections of the plurality of data lines and the plurality of gate lines defining a plurality of pixel regions; a gate driver contacting ends of the plurality of gate lines and sequentially scanning a gate pulse to the plurality of gate lines; a data driver contacting ends of the plurality of data lines and applying a data pulse to the plurality of data lines; a plurality of first thin-film transistors disposed in the plurality of pixel regions; a feed line outputting an OFF voltage to the plurality of first thin-film transistors; and a plurality of second thin-film transistors connecting the feed line to the plurality of gate lines.

In the present invention, the second thin-film transistor receives the gate pulse from the neighboring gate line and delivers the OFF voltage from the feed line to the corresponding gate line. Each second thin-film transistor includes a drain electrode connected to the corresponding gate line, a source electrode connected to the feed line, and a gate electrode connected to the neighboring gate line. The data driver, the gate driver, the plurality of second thin-film transistors, and the feed line are formed over the transparent substrate. The OFF voltage at the feed line is a ground voltage or a common voltage. The gate pulse applied from the gate driver to the plurality of gate lines includes a gate high voltage, which is an ON voltage turning on the plurality of first thin-film transistors, and a gate low voltage, which is an OFF voltage turning off the plurality of first thin-film transistors. The OFF voltage at the feed line is the gate low voltage of the gate pulse. The OFF voltage is applied to the first thin-film transistors through the plurality of second thin-film transistors and gate lines so that it shortens a falling time of the gate pulse.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiment of the present invention, which is illustrated in the accompanying drawings. Wherever possible, the similar reference numbers will be used throughout the drawings to refer to the same or like parts.

Figure 5:
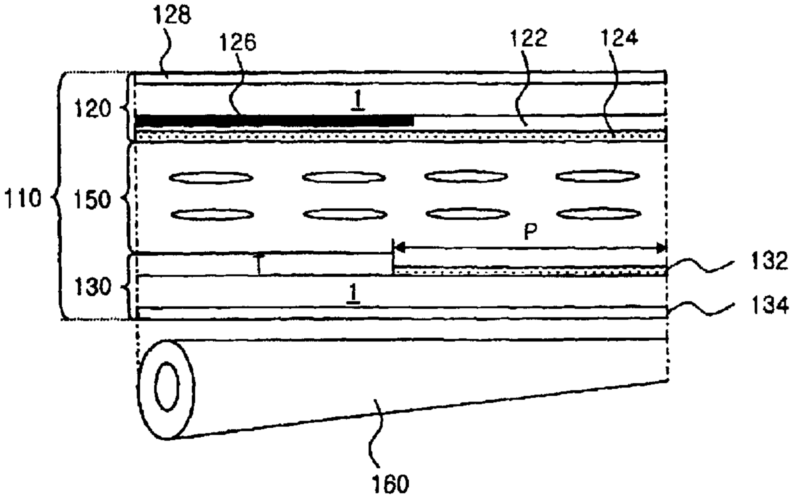
FIG. 5 is a cross-sectional view of a pixel of a liquid crystal display panel according to the present invention.
Figure 6:
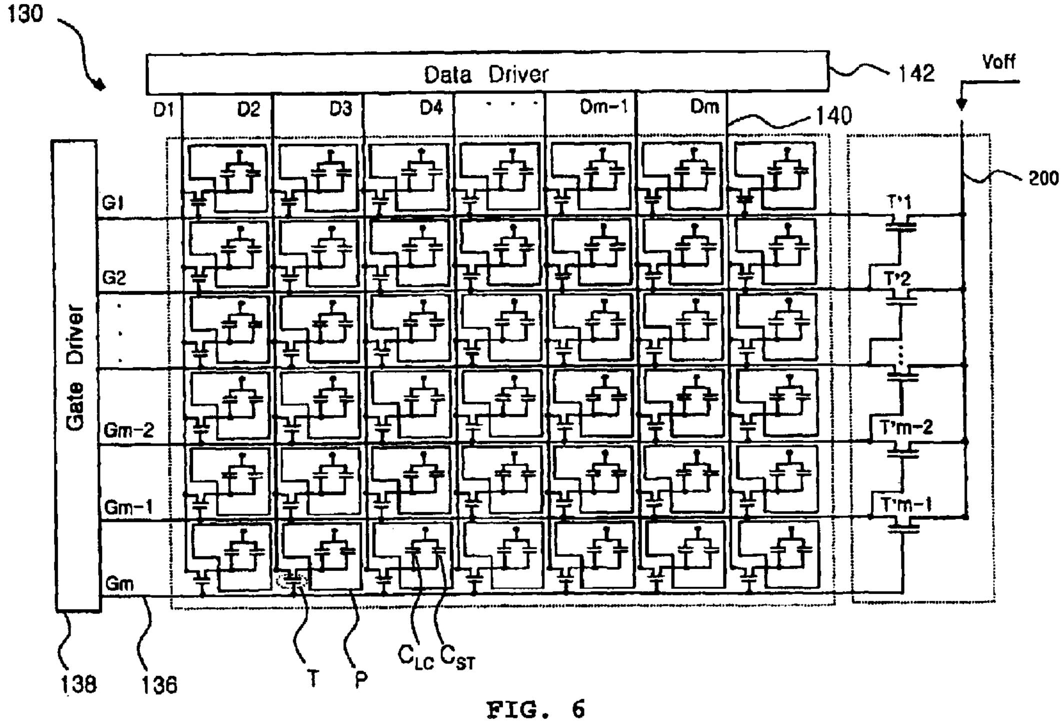
FIG. 6 is a schematic diagram showing a main component of an active matrix liquid crystal display according to the present invention.

FIG. 5 is a cross-sectional view of a pixel of an LCD panel according to the present invention. FIG. 6 is a schematic diagram showing a main component of an active matrix LCD according to the present invention.

As shown in FIGS. 5 and 6, the LCD panel 110 of the present invention includes an upper color filter substrate 120, a lower array substrate 130 and an LC interposed between the upper color filter substrate 120 and the lower array substrate 130. In the upper color filter substrate 120, a color filter layer 122 is disposed on a rear surface of a transparent substrate 1, and a common electrode 124 applying an electrode field to the liquid crystal is disposed on the color filter layer 122. The color filter layer 122 can be of a red, green or blue color filter. A black matrix 126 is disposed between the transparent substrate 1 and the common electrode 124 in order to divide the color filter layer 122 into the red, green and blue color filters and prevent ambient light from reaching a TFT T of the lower array substrate 130. A common voltage Vcom is applied to the common electrode 124.

In the lower array substrate 130, a plurality of gate lines 136 applying gate pulses are formed over a transparent substrate 1. A plurality of data lines 140 applying data pulses are disposed perpendicular to the plurality of gate lines 136 over the transparent substrate 1. The plurality of gate and data lines 136 and 140, respectively, define a plurality of pixel regions P that are arranged in a matrix and substantially display images. A plurality of first TFTs T and a plurality of pixel electrodes 132 are disposed in the pixel regions P. Each TFT T corresponds to a pixel electrode 132 within the pixel region P.

Each pixel electrode 132 and common electrode 124, along with the LC layer 150 between the two electrodes, form an LC capacitor $C_{LC}$, and the potential difference between the two electrodes causes the LC molecules to be distorted, thereby rotating the polarization of incident light. In order to compensate for the problem of parasitic capacitance, a storage capacitor $C_{ST}$ is disposed in each pixel region P and connected in parallel with the LC capacitor $C_{LC}$.

As shown in FIG. 5, a first polarizer 128 and a second polarizer 134 are disposed on the outer surfaces of the upper color filter substrate 120 and the lower array substrate 130, respectively. The first and second polarizers 128 and 134 are formed as a thin film and respectively applied to the upper color filter substrate 120 and the lower array substrate 130. A backlight device 160 is disposed beneath the lower array substrate 130 and emits artificial light towards the LC panel 110.

The upper color filter substrate 120 and the lower array substrate 130 may be sealed by a sealant (not shown) to prevent the leakage of the liquid crystals interposed between the two substrates 120 and 130. Furthermore, upper and lower alignment layers (not shown) may be formed on the inner surfaces of the upper color filter substrate 120 and lower array substrate 130 in order to define an initial arrangement of the LC molecules.

As shown in FIG. 6, a gate driver 138 is connected to the plurality of gate lines 136 and is disposed in periphery of the lower array substrate 130. The gate driver 138 sequentially applies a gate pulse to the plurality of gate lines 136. The gate driver 138 applies a gate high voltage, which is an ON voltage turning on the plurality of first TFTs T, and a gate low voltage, which is an OFF voltage turning off the plurality of first TFTs T. A data driver 142 is connected to the plurality of data lines 140 and is disposed in a top peripheral portion of the lower array substrate 130, and applies a data pulse to the plurality of data lines 140. In the present invention, the lower array substrate 130 includes a feed line 200 applying an OFF voltage Voff to the plurality of first TFTs T, and a plurality of second TFTs T' connecting the feed line 200 to the plurality of gate lines 136. As shown in FIG. 6, each second TFT T' corresponds to a gate line 136.

Accordingly, the lower array substrate 130 includes two kinds of TFTs: One is the first TFT T disposed in each pixel region P, and the other is the second TFT T' connecting the feed line 200 to each gate line 136. The feed line 200 is disposed in A periphery of the lower array substrate 30 opposing the gate driver 138, and connected to the plurality of gate lines 136 through the plurality of second TFTs T'. Using the next gate line's gate pulse, the second TFT T' applies the OFF voltage Voff flowing from the feed line 200 to the corresponding gate line. Namely, the T1 thin-film transistor applies the OFF voltage Voff to the G1 gate line using the gate pulse flowing to the G2 gate line. Substantially, the OFF voltage Voff applied from the feed line 200 to the gate lines G1 to Gm is a ground voltage, a gate low voltage, or a common voltage.

Figure 7:
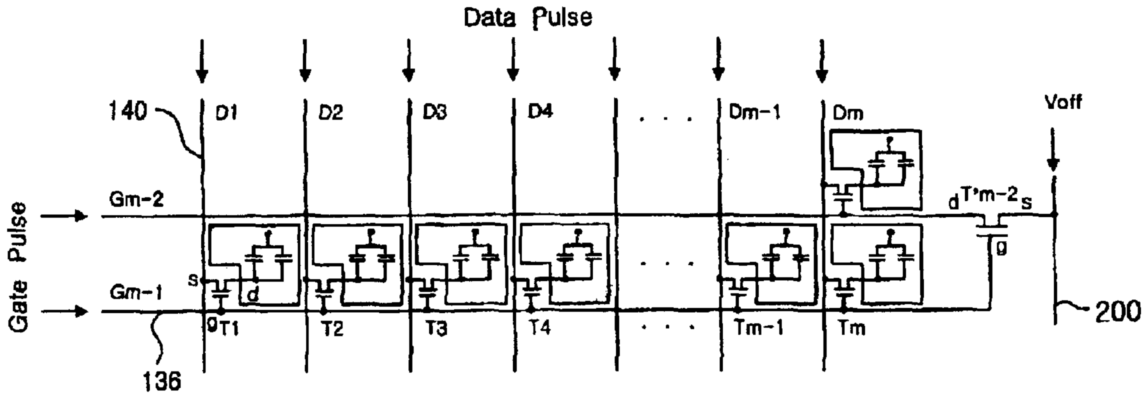
FIG. 7 is a partial enlarged view of a circuit diagram illustrating the active matrix liquid crystal display of FIG. 6.

FIG. 7 is a partial enlarged view of a circuit diagram illustrating the active matrix liquid crystal display of FIG. 6.

As shown in FIGS. 6 and 7, each second TFT T' includes a gate electrode "g" connected to the next gate line, a source electrode "s" connected to the feed line 200, and a drain electrode "d" connected to the corresponding gate line. The gate electrode "g" of the second TFT T'm-2 corresponding to the Gm-2 gate line is connected to the drain electrode of the TFT T'm-1 corresponding to the Gm-1 gate line.

Furthermore, as shown in FIGS. 6 and 7, the first TFTs1 to Tm are connected to the Gm-1 gate line, for example. Each first TFT T includes a gate electrode "g" connected to the Gm-1 gate line, a source electrode "s" connected to one of the data lines D1 to Dm, and a drain electrode "d" connected to the LC capacitor $C_{LC}$. Accordingly, the first TFTs T1–Tm are turned on and off depending on the gate pulse flowing the Gm-1 gate line and apply the data pulse to the LC capacitor $C_{LC}$, thereby acting as switching elements.

As mentioned above, the plurality of second TFTs T' are connected to one another, and connect the plurality of gate lines G1–Gm to the feed line 200. For example, the second TFT T'm-2 delivers the OFF voltage Voff from the feed line 200 to the Gm-2 gate line using the gate pulse flowing from the next Gm-1 gate line. In the TFT T'm-2, the gate electrode "g" is connected to the Gm-1 gate line, the drain electrode "d" is connected to the Gm-2 gate line, and the source electrode "s" is connected to the feed line 200.

The LCD panel 110 of FIG. 5 displays images frame-by-frame. The gate driver 138 applies the gate pulse, which is an ON voltage for the first TFTs T1 to Tm, to sequentially scan the G1 to Gm gate lines. The data driver 142 applies the data pulse, which corresponds to the gate pulse, to all data lines D1 to Dm, respectively. For example, when the gate pulse is applied to the Gm-1 gate line, the gate pulse moves from right to left in FIG. 6 and turns on the T1 to Tm TFTs. At that time, the data pulse output from the data driver 142 is applied to the D1 to Dm data lines, and thus, the data pulse applied to the D1 to Dm data lines is delivered to the designated LC capacitor $C_{LC}$ of the pixel P. The gate pulse arriving at the first TFT Tm connected to the Gm-1 gate line then turns on the second TFT T'm-2 connected to the Gm-2 gate line. Thus, the second TFT T'm-2 applies the OFF voltage Voff of the feed line 200 to the Gm-2 gate line. Therefore, the first TFTs T connected to the Gm-2 gate line are compulsorily turned off.

In the present invention, the OFF voltage is applied to the gate line using the gate pulse applied to the next gate line. In other words, the gate pulse flowing to the gate line turns on the second TFT whose drain electrode is connected to the neighboring gate line so that the OFF voltage flowing from the feed line is applied to that neighboring gate line. Therefore, the first TFTs connected to that neighboring gate line are compulsorily turned off.

Figure 8A:
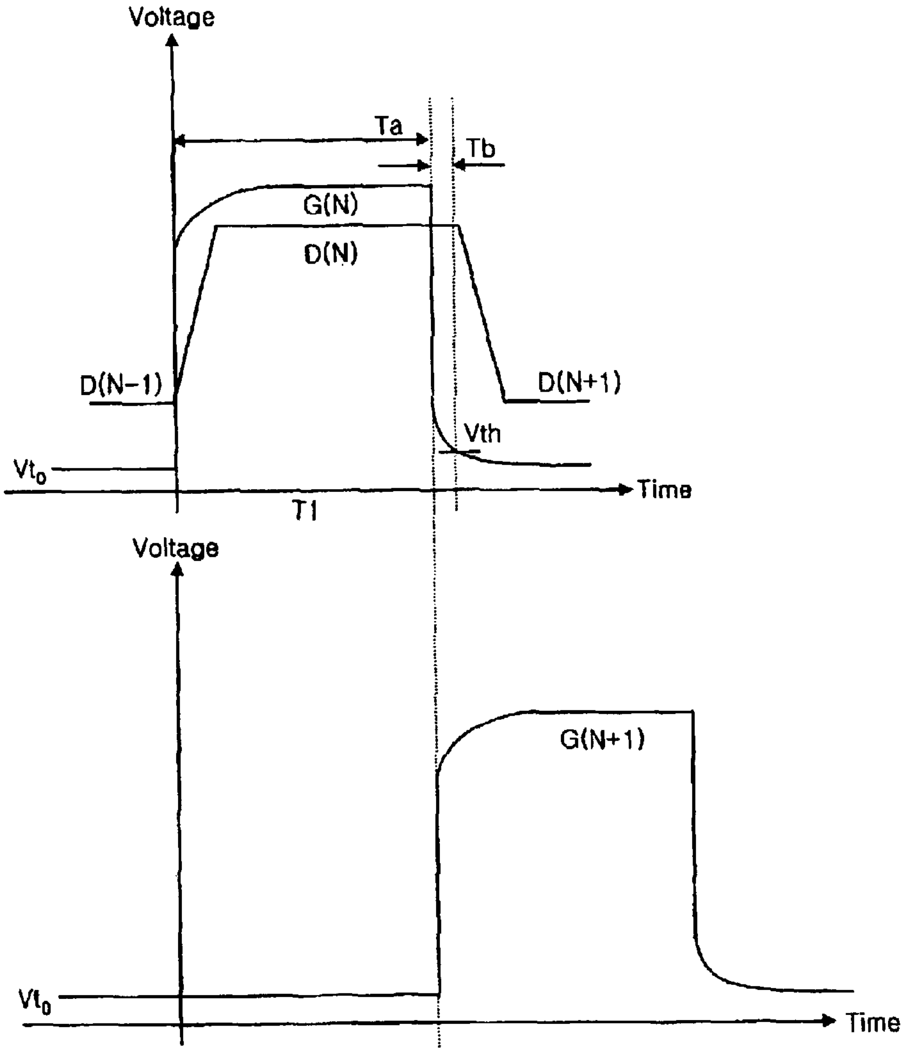
FIGS. 8A and 8B are graphs illustrating a gate pulse and a data pulse which are applied to the different first thin-film transistors T1 and Tm connected to the Gm-1 gate line of FIG. 7.
Figure 8B:
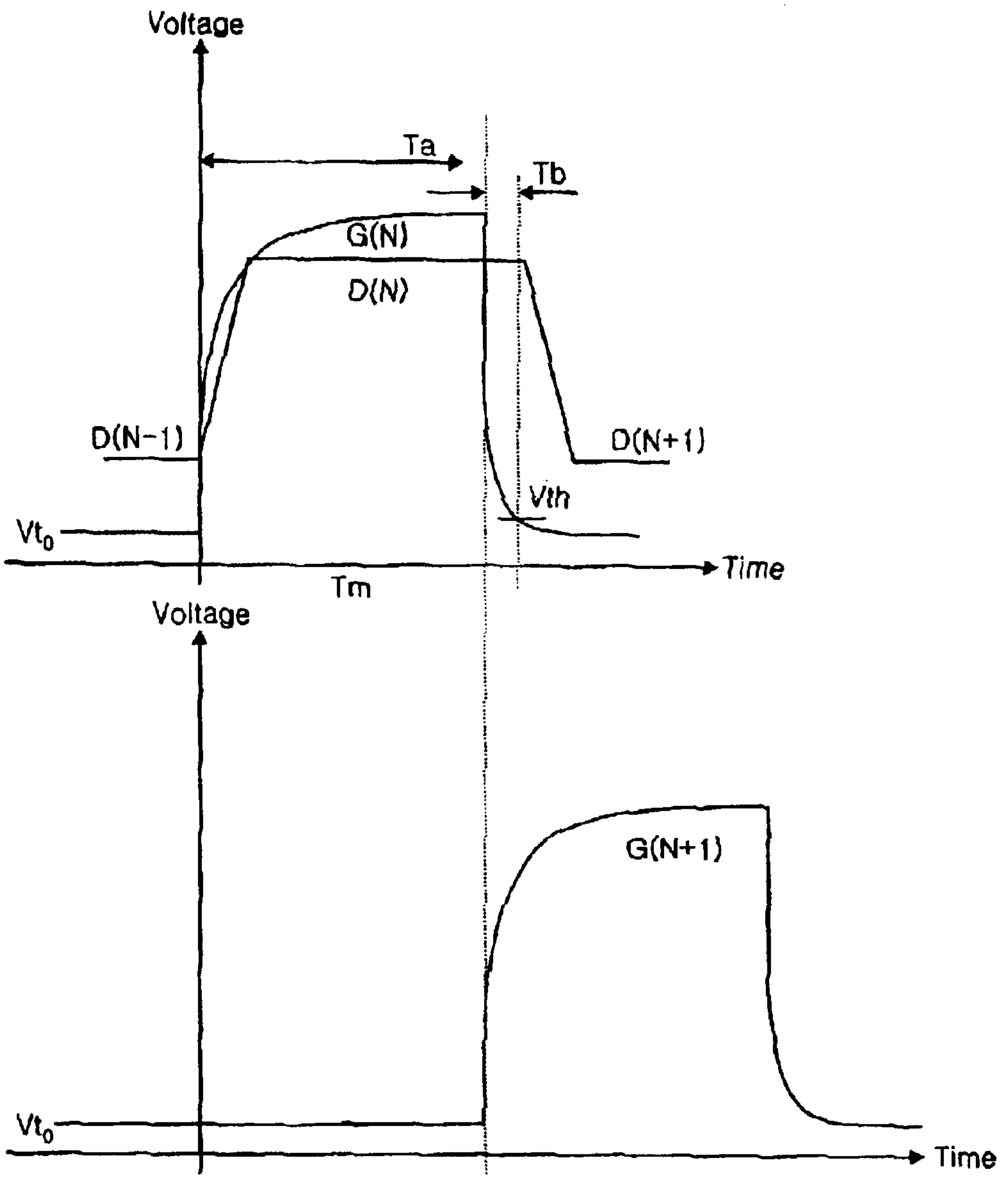

FIGS. 8A and 8B are graphs illustrating a gate pulse and a data pulse which are applied to the different first TFTs T1 and Tm connected to the Gm-1 gate line of FIG. 7. FIG. 8A corresponds to the first TFT T1 to which the gate pulse G(N) is first applied, and FIG. 8B corresponds the first TFT Tm to which the gate pulse G(N) is applied last through the Gm-1 gate line. Here, the Gm-1 gate line is selected for simplification of description. The description hereinafter applies to the other gate lines G1 to Gm, as well. Further, as mentioned before and shown in FIG. 7, the first TFTs connected to Gm-1 gate line is denoted as T1 to Tm from left to right, and the second TFTs whose source electrode is connected to the feed line is denoted as T'.

In FIGS. 8A and 8B, D(N) denotes the data pulse applied to the First TFT T1 and the First TFT Tm. D(N−1) denotes the data pulse applied to the first TFTs connected to the Gm-2 gate line prior to the Gm-1 gate line. D(N+1) denotes the data pulse applied to the first TFTs connected to the Gm gate line next to the Gm-1 gate line. G(N+1) denotes the gate pulse applied to the Gm gate line next to the Gm-1 gate line.

The gate pulse G(N) and the data pulse D(N) have a square waveform and thus have a rising initially, maintain a predetermined voltage in the middle, and have a falling slope in a last step. Each time the gate pulse G(N) applied to the Gm-1 gate line is rising, the first TFTs T1 to Tm are tuned ON if the voltage is boosted over a threshold voltage Vth. Thereafter, the date pulse D(N) is applied to the LC capacitor $C_{LC}$ and then the electrical charges are stored in the LC capacitor $C_{LC}$. When the gate pulse G(N) falls below the threshold hold voltage Vth, the first TFTs T1 to Tm are turned OFF and then the data pulse D(N) is shut off from the LC capacitor $C_{LC}$.

Moreover, in FIGS. 8A and 8B, a section Ta denotes a charging time in which the data pulse voltage is held by the LC capacitor $C_{LC}$, and a section Tb denotes an OFF time that the first TFTs T1 to Tm are turned off when the gate pulse G(N) falls to the threshold voltage Vth. During the section Tb, although the gate pulse G(N) continues to fall, the data pulse D(N) maintains a designated voltage. Then, when the gate pulse G(N) reaches the threshold voltage Vth, the data pulse D(N) starts falling. The falling of data pulse D(N) with the arrival of gate pulse to the threshold voltage Vth maintains the reliability of the first TFTs during their OFF-state operation and prevent noises caused by the next data pulse D(N+1).

As described in the discussion of the related art, when the section Tb is prolonged due to the RC delay, the charging time denoted as the section Ta is shortened and thus the image quality of the LCD worsens. However in the present invention, when the gate pulse G(N) is applied to the Gm-1 gate line, the gate pulse G(N) makes the second TFT T'm-2 turn ON so that the OFF voltage Voff is delivered to the Gm-2 gate line through the source and drain electrodes of the second TFT T'm-2. Therefore, the first TFTs whose gate electrodes are connected to the Gm-2 gate line receive the OFF voltage Voff and then are compulsorily turned off. Accordingly, as compared to the related art, the present invention compensates for the falling time delay caused by the RC delay of the gate pulse.

Figure 1:
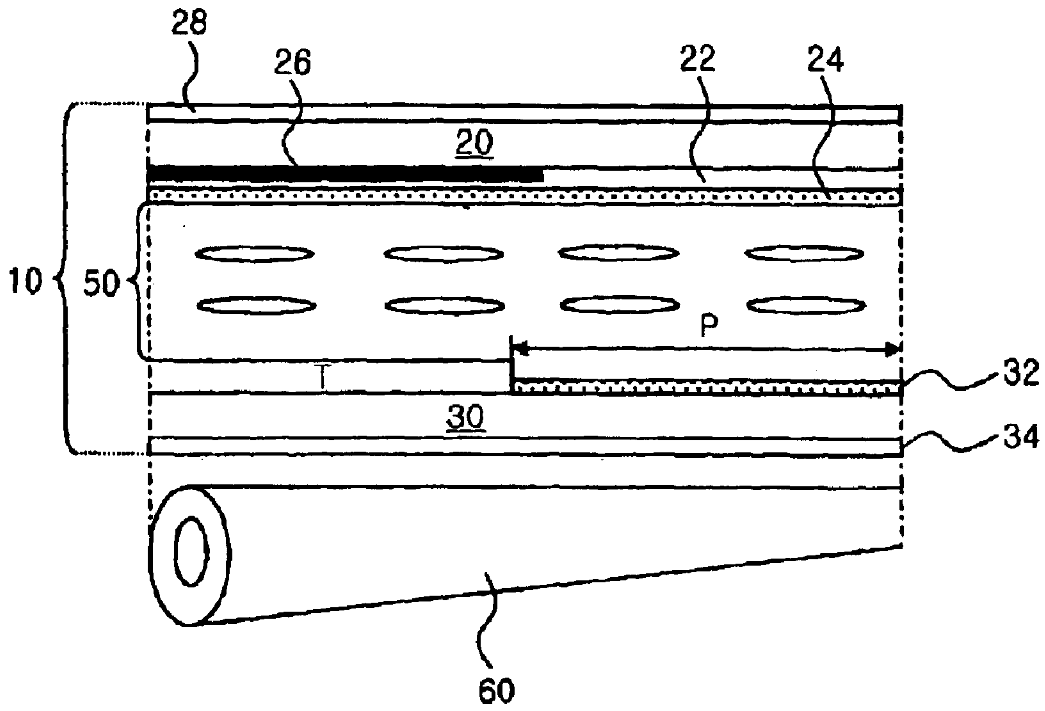
FIG. 1 (RELATED ART)
FIG. 1 is a cross-sectional view of a pixel of a related art LCD panel in an active matrix LCD.
Figure 2:
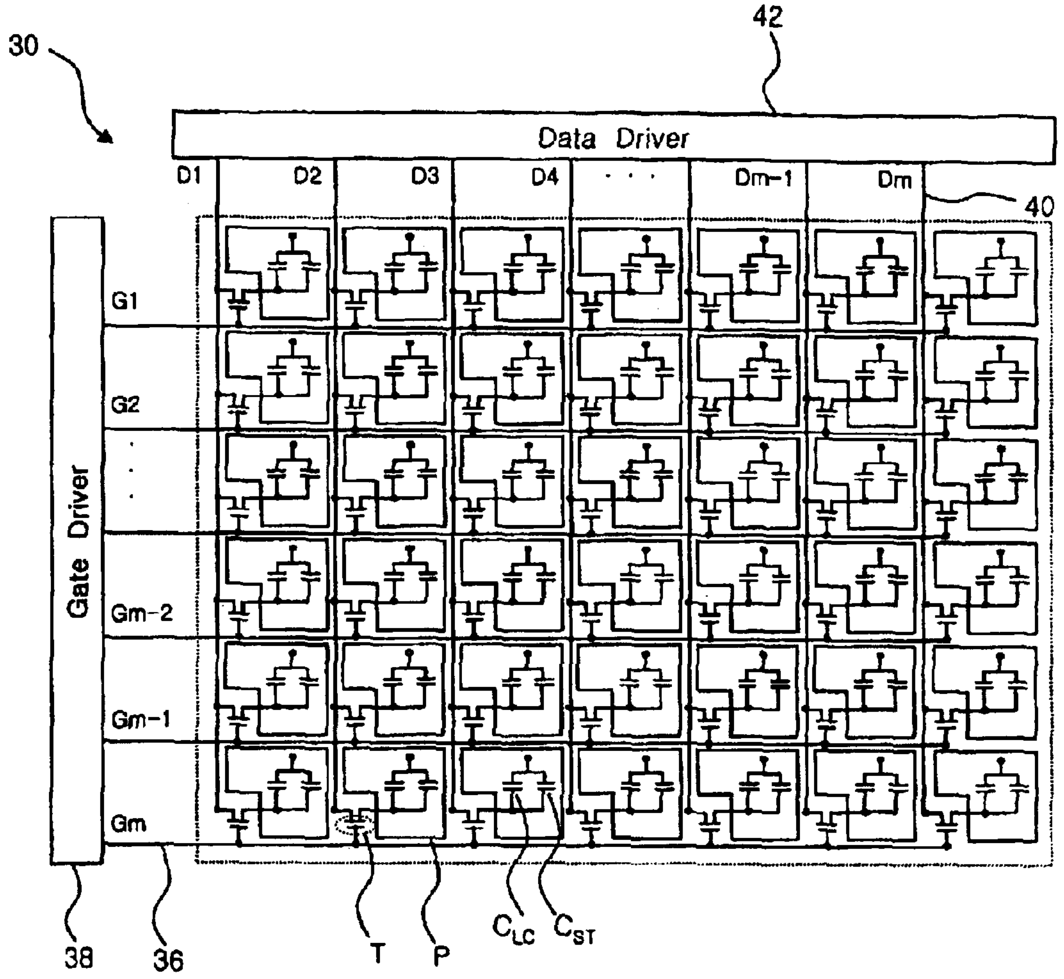
FIG. 2 (RELATED ART)
FIG. 2 is a schematic diagram showing a main component of a related art active matrix liquid crystal display.
Figure 3:
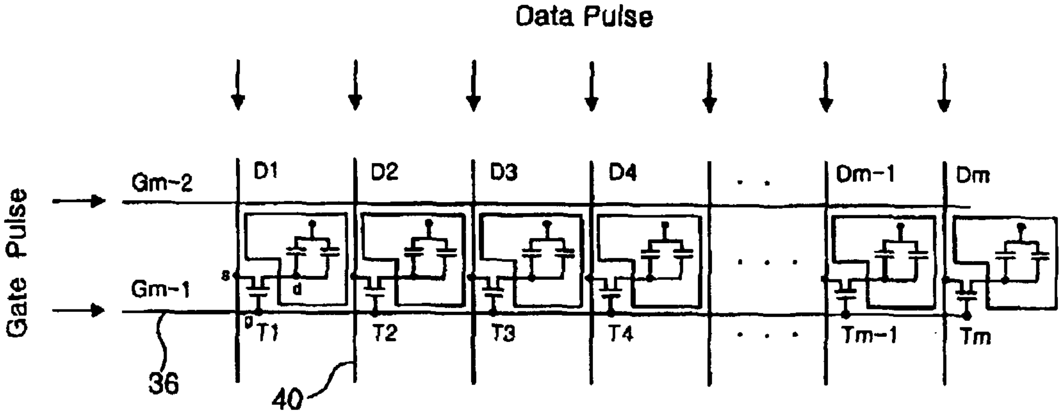
FIG. 3 (RELATED ART)
FIG. 3 is a partial enlarged view of a circuit diagram illustrating the related art active matrix liquid crystal display of FIG. 2.
Figure 4A:
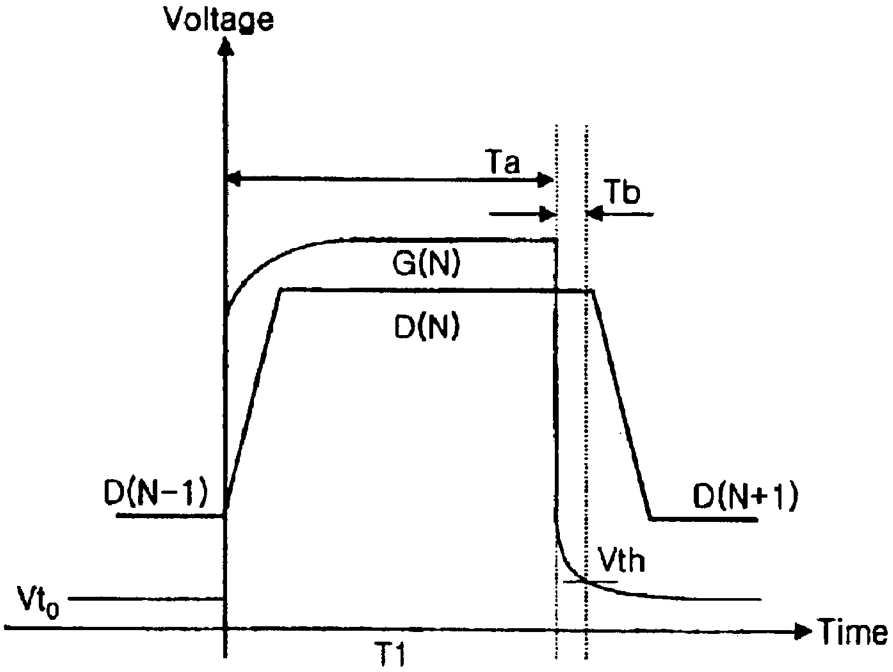
FIG. 4A (RELATED ART)
FIGS. 4A and 4B are graphs illustrating a gate pulse and a data pulse which are applied to the different thin-film transistors T1 and Tm connected to the Gm-1 gate line of FIG. 3.
Figure 4B:
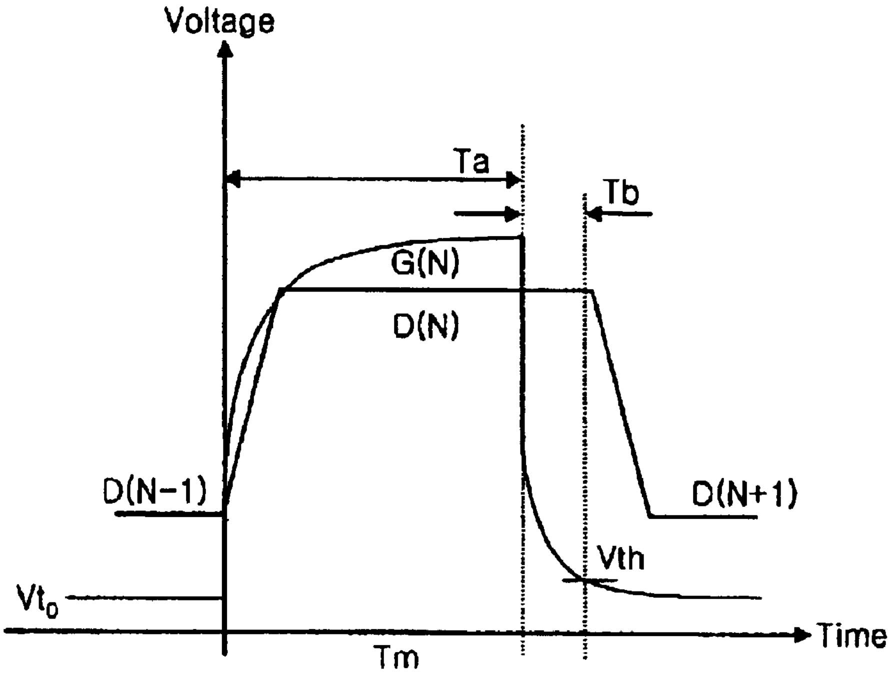
FIG. 4B (RELATED ART)

The section Tb has the similar width in FIGS. 8A and 8B. That means that the falling time of the gate pulse is similar between the TFT T1 and the TFT Tm, unlike in the related art LCD, where the section Tb does not have a similar width, as shown in FIGS. 4A and 4B.

In the present invention, the gate pulse G(N) of the Gm-1 gate line lets the T'm-2 TFT to apply the OFF voltage Voff of the feed line 200 to the Gm-2 gate line. And the first TFTs T connected to the Gm-2 gate line are tuned off by force, thereby shortening the OFF time of the gate pulse.

The above-mentioned process of compulsorily shortening the falling time of the gate pulse proceeds sequentially along with the scanning direction of the gate pulse. In other words, since the gate pulse scans from the G1 gate line to the Gm gate line, the OFF voltage Voff is also sequentially applied to the gate lines G1 to Gm-1 throughout the second TFTs T'1 to T'm-1. This application of the OFF voltage Voff solves the problem of RC delay of the gate pulse and shortens the falling time of the gate pulse.

The present invention can be applied to an LC panel including polycrystalline silicon in the TFTs with even more favorable results. When the polycrystalline silicon is adopted to the TFT as an active layer carrying the carriers, that TFT can have a great carrier mobility. Thus, the gate driver and/or the data driver can be installed in the lower array substrate. Moreover, the LC panel having the polysilicon can have the second TFTs and feed line of the present invention in the lower array substrate, and these second TFTs are formed with the first TFT during the same process. That means that the cost of production is reduced.

According to the present invention, as the falling time of gate pulse becomes shortened due to the fact that the OFF voltage is applied to the gate lines through the second TFTs, the OFF time Tb reaching the threshold voltage Vth also becomes shortened. Therefore, the charging time in the LC capacitor $C_{LC}$ is prolonged and the LC molecules can be arranged properly. Moreover, the LCD can improves its brightness, contrast ratio, and resolution. Additionally, the displayed picture is not blurred, and the after-image phenomenon and flickering do not occur. Accordingly, the reliability of the liquid crystal display becomes greater.

Furthermore, when the lower array substrate of the present invention is adopted in the LC panel, additional circuitry, such as a gate modulator, is not required, and additional drivers are not required at both ends of the gate and/or data lines. Thus, the costs of the LCD can be lowered.

While the invention has been particularly shown and described with reference to an illustrated embodiment thereof, it will be understood by those skilled in the art that the foregoing and other changes in form and details may be made therein without departing from the spirit and scope of the invention.

What is claimed is:

1. An array substrate for use in a liquid crystal display, comprising:

a transparent substrate;

a plurality of gate lines arranged over the transparent substrate in a transverse direction;

a plurality of data lines arranged over the transparent substrate in a longitudinal direction substantially perpendicular to the plurality of gate lines, intersections of the plurality of data lines and the plurality of gate lines defining a plurality of pixel regions;

a gate driver contacting ends of the plurality of gate lines and sequentially scanning a gate pulse to the plurality of gate lines;

a data driver contacting ends of the plurality of data lines and applying a data pulse to the plurality of data lines;

a plurality of pixel electrodes disposed in the plurality of pixel regions;

a plurality of first thin-film transistors disposed in the plurality of pixel regions, each first thin-film transistor including a gate electrode connected to a gate line, a source electrode connected to a data line, and a drain electrode connected to the pixel region;

a feed line outputting an OFF voltage to the plurality of first thin-film transistors; and a plurality of second thin-film transistors contacting each other and connecting the feed line to the plurality of gate lines.

2. The array substrate of claim 1, wherein each of the plurality of second thin-film transistors receives the gate pulse from a first gate line and delivers the OFF voltage from the feed line to a second gate line.

3. The array substrate of claim 1, wherein each second thin-film transistor includes a drain electrode connected to a first gate line, a source electrode connected to the feed line, and a gate electrode connected to a second gate line.

4. The array substrate of claim 1, wherein the data driver, the gate driver, the plurality of second thin-film transistors, and the feed line are formed over the transparent substrate.

5. The array substrate of claim 1, wherein the OFF voltage output from the feed line is a ground voltage.

6. The array substrate of claim 1, wherein the OFF voltage output from the feed line is a common voltage.

7. The array substrate of claim 1, wherein the gate pulse applied from the gate driver to the plurality of gate lines includes a gate high voltage, which is an ON voltage turning on the plurality of first thin-film transistors, and a gate low voltage, which is an OFF voltage turning off the plurality of first thin-film transistors.

8. The array substrate of claim 7, wherein the OFF voltage output from the feed line is the gate low voltage of the gate pulse.

9. The array substrate of claim 1, wherein the OFF voltage shortens a falling time of the gate pulse.

10. The array substrate of claim 1, wherein the OFF voltage is applied to the first thin-film transistors through the plurality of second thin-film transistors and gate lines.

11. The array substrate of claim 10, wherein a falling time of the gate pulse is similar in each of the plurality of first thin-film transistors.

12. The array substrate of claim 1, wherein each of the plurality of second thin-film transistors delivers the OFF voltage from the feed line to a first gate line using the gate pulse from an adjacent gate line.

13. The array substrate of claim 1, wherein the feed line is disposed in a periphery of the array substrate opposing the gate driver.

14. An array substrate for use in a liquid crystal display, comprising:

a transparent substrate;

a plurality of gate lines arranged over the transparent substrate in a transverse direction;

a plurality of data lines arranged over the transparent substrate in a longitudinal direction substantially perpendicular to the plurality of gate lines, intersections of the plurality of data lines and the plurality of gate lines defining a plurality of pixel regions;

a gate driver contacting ends of the plurality of gate lines and sequentially scanning a gate pulse to the plurality of gate lines;

a data driver contacting ends of the plurality of data lines and applying a data pulse to the plurality of data lines;

a plurality of first thin-film transistors disposed in the plurality of pixel regions;

a feed line outputting an OFF voltage to the plurality of first thin-film transistors; and a plurality of second thin-film transistors connecting the feed line to the plurality of gate lines.

15. The array substrate of claim 14, wherein each of the plurality of second thin-film transistors receives the gate pulse from a first gate line and delivers the OFF voltage from the feed line to a second gate line.

16. The array substrate of claim 14, wherein each first thin-film transistor includes a drain electrode connected to the pixel region, a source electrode connected to a data line, and a gate electrode connected to a gate line.

17. The array substrate of claim 14, wherein each second thin-film transistor includes a drain electrode connected to a first gate line, a source electrode connected to the feed line, and a gate electrode connected to a second gate line.

18. The array substrate of claim 14, wherein the data driver, the gate driver, the plurality of second thin-film transistors, and the feed line are formed over the transparent substrate.

19. The array substrate of claim 14, wherein the OFF voltage output from the feed line is a ground voltage.

20. The array substrate of claim 14, wherein the OFF voltage output from the feed line is a common voltage.

21. The array substrate of claim 14, wherein the gate pulse applied from the gate driver to the plurality of gate lines includes a gate high voltage, which is an ON voltage turning on the plurality of first thin-film transistors, and a gate low voltage, which is an OFF voltage turning off the plurality of first thin-film transistors.

22. The array substrate of claim 21, wherein the OFF voltage output from the feed line is the gate low voltage of the gate pulse.

23. The array substrate of claim 14, wherein the OFF voltage shortens a falling time of the gate pulse.

24. The array substrate of claim 14, wherein the OFF voltage is applied to the first thin-film transistors through the plurality of second thin-film transistors and gate lines.

25. The array substrate of claim 24, wherein a falling time of the gate pulse is similar in each of the plurality of first thin-film transistors.

26. The array substrate of claim 14, wherein each of the plurality of second thin-film transistors delivers the OFF voltage from the feed line to a first gate line using the gate pulse from an adjacent gate line.

27. The array substrate of claim 14, wherein the feed line is disposed in a periphery of the array substrate opposing the gate driver.

* * * * *